Feb. 24, 1970  R. R. WOLFNER ET AL  3,496,653
BOOK WITH MAGNETICALLY HELD TILES

Filed May 13, 1968  2 Sheets-Sheet 1

INVENTORS
RHODA RUTH WOLFNER
MYRTLE S. CONTE
BY
Burgess, Ryan, & Hicks
ATTORNEYS

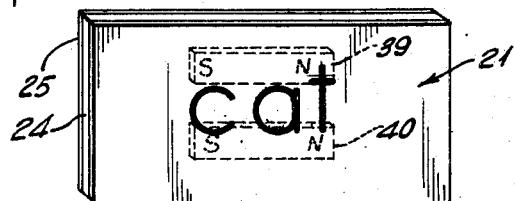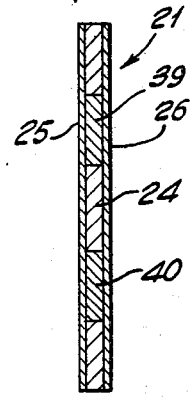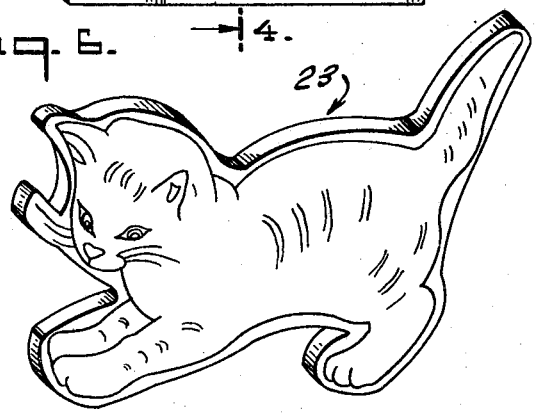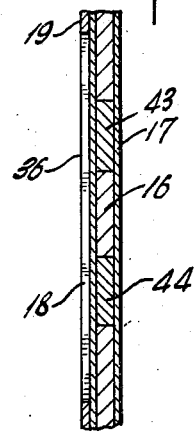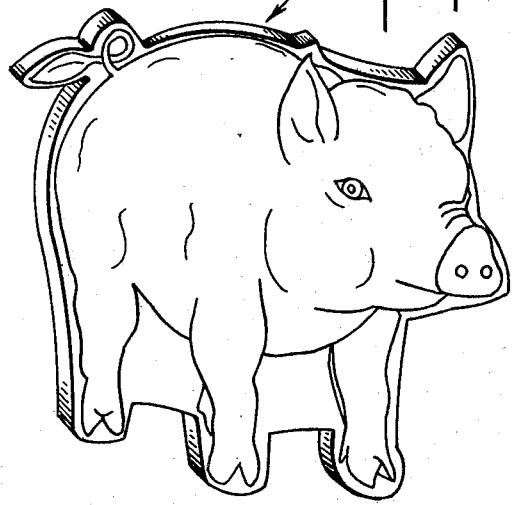

United States Patent Office 3,496,653
Patented Feb. 24, 1970

3,496,653
BOOK WITH MAGNETICALLY HELD TILES
Rhoda Ruth Wolfner, Bayside, N.Y. (278 Gramercy Drive, Jericho, N.Y. 11753), and Myrtle S. Conte, 643 Harold St., Mamaroneck, N.Y. 10543
Filed May 13, 1968, Ser. No. 728,672
Int. Cl. G09b 1/08
U.S. Cl. 35—73                          8 Claims

ABSTRACT OF THE DISCLOSURE

A children's book having pages bearing pictures and movable tiles bearing words. The tiles cling to preselected areas of the book's pages by means of hidden magnets in the tiles and the pages, indicating to a child the correct correspondence between words on the tiles and pictures on the book's pages.

BACKGROUND OF THE INVENTION

Much time is spent by young school children in learning to recognize and manipulate symbols. These may be letters, numbers, operator symbols such as plus or minus signs, or whole words and sentences. Children may be required simply to learn the proper sequence of symbols, as in arranging letters in alphabetical order, or to recognize correspondence between symbols, as by matching a noun with a picture of the object for which the noun stands, or perhaps with a corresponding noun in a foreign language. In order to lessen the need for supervision during this learning process, it has been proposed to provide the child with a teaching aid in the form of a panel bearing symbols and having selected locations marked thereon, each location corresponding to a particular symbol. In addition to the panel, the child would be supplied with movable pieces, which may be called "tiles," each bearing a symbol corresponding to one on the panel. By means of magnets, projecting pin or other devices, each tile could be attached on the panel in one, but only one, of the selected locations. By this means, for example, a child might learn the meaning of the word "apple" by locating a tile bearing that word in a preselected space corresponding to a picture of an apple on the panel. Attempts to locate the "apple" tile in other preselected spaces on the panel would fail, thus teaching the child to associate the word "apple" only with the picture of that fruit.

The types of teaching device described are shown in United States Patent No. 3,010,228 to Torre, and French Patent No. 1,129,286, delivré Sept. 3, 1956, to Renault. These employ a panel which is usable on only one side, and is of rather rigid, heavy construction. In addition they do not provide for the convenient storage of the tiles, for protection of the panel and tiles when not in use, and for the presentation to the child of a series of panels in a preselected order.

SUMMARY

In the present invention panels bearing symbols are loosely bound together along one edge, in book fashion. Each panel is equipped on both sides with preselected areas corresponding to particular tiles. Magnets are embedded within each panel and in the corresponding tiles, their placement and polarity being so arranged that the necessary selectivity of retention of the tiles is achieved. The same magnets in a panel serve to adhere tiles to both sides of the panel. The panels are equipped with recessed storage positions in which tiles may be stored, the tiles being held in the storage position by the attraction of magnets and secured against displacement therefrom by the sides of the recesses. The tiles associated with a particular "page" in the assembly are keyed thereto by color or other means.

By binding the panels together in book form the order in which they are presented to the child is controlled. In addition, the individual panels may be made thinner and less cumbersome because of the support and protection provided by the adjacent panels and by the covers of the book, if they are provided. The complete assemblage, including tiles, is a compact, unitary structure, so that auxiliary boxes to hold the tiles are not required. The particular tiles which correspond to any one page are held conveniently adjacent that page in recesses on the facing page, so that they are ready to the hand of the child using the device. Each magnet embedded in one "page" does double duty, serving to store tiles in recesses on one side of the page and to attract tiles to symbols on the other side of said "page."

BRIEF DESCRIPTION OF THE DRAWING

FIG. 3 is a perspective view of a tile;

FIG. 4 is a cross section on cutting plane 4—4 of FIG. 3;

FIG. 5 is a cross section on cutting plane 5—5 of FIG. 2; and

FIGS. 6, 7 and 8 are perspective views of tiles.

DESCRIPTION OF THE PREFERRED EMBODIMENT

Figure 1:
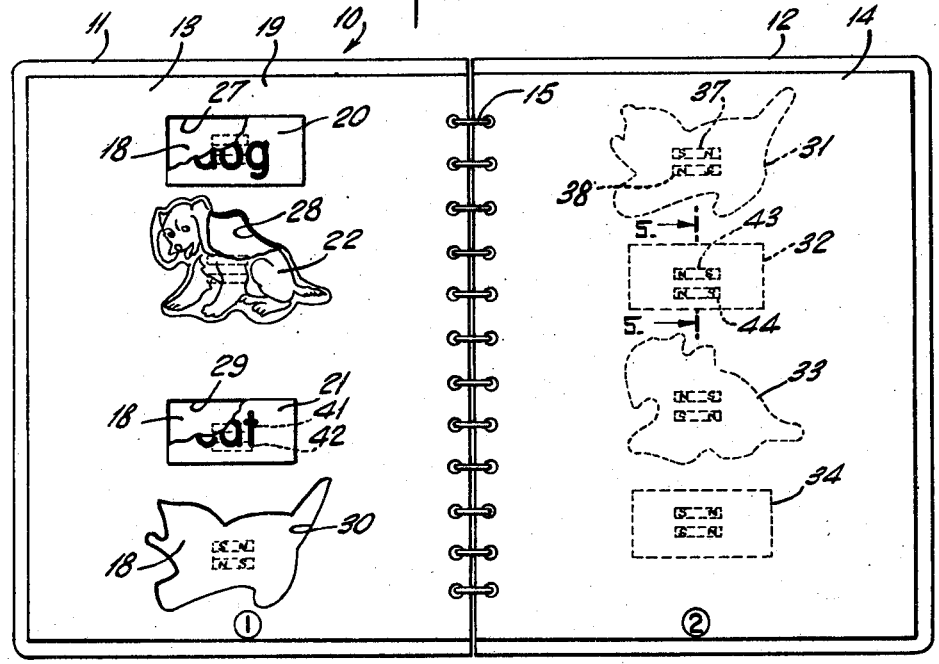
FIG. 1 is a plan view of the book open to pages 1 and 2.
Figure 2:
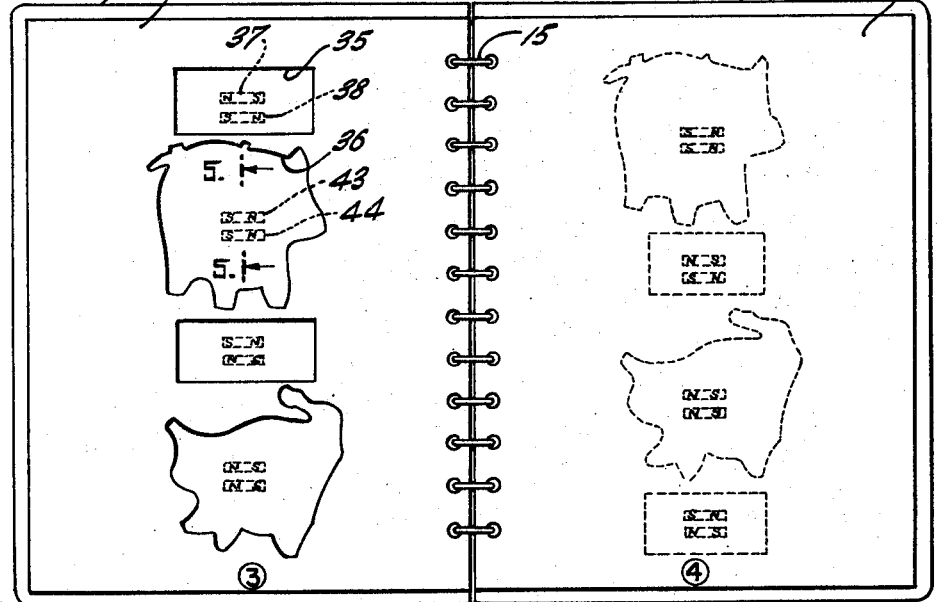
FIG. 2 is a plan view of the book open to pages 3 and 4.

As seen in FIGS. 1 and 2 the book 10 is provided with a front cover 11 and a rear cover 12. A plurality of panels, of which panels 13, 14, and 32 are shown, are loosely bound to the covers by helical wire 15 and may be turned as are the pages of a book.

Each of the panels (see FIG. 5) is of a glued sandwich construction, comprising a base layer 16, which may be of stiff, relatively thick pasteboard, a first outer layer 17 of heavy paper, an intermediate layer 18, also of heavy paper, and a second outer layer 19, which may advantageously be of light cardboard or bristol board.

Associated with the panels are tiles. As shown, these are of two types, that of tiles 20, 21 and 33, which are rectangular in shape, and a second type similar to tiles 22, 23, and 34 which are of irregular outline. As shown in FIGS. 3 and 4, the tiles are comprised of a base layer 24 of pasteboard to which are glued outer layers 25 and 26 of heavy paper. Those tiles of rectangular outline bear upon one face thereof a word or symbol such as the word "CAT" shown in FIG. 3. Those of irregular shape bear upon their face the likeness of some object, such as the cat shown in FIG. 6 on tile 23. The irregular outline of the tile follows the outline of the object depicted.

The second outer layer 19 on each panel is cut away in preselected areas, exposing the intermediate layer 18 and creating shallow recesses equal in depth to the thickness of the second outer layer. These recesses are shaped to receive the tiles associated with the panel in question and its facing panel. In FIG. 1, for example, page "1" is seen with tile 20 shown in place in recess 27, tile 22 in recess 28, and tile 21 in recess 29. Recess 30, which corresponds to tile 23, is shown empty.

As seen in FIG. 1, page "1" on panel 13 is opposed to page "2" on panel 14. Page "2" is printed in ink with outlines corresponding to the outlines of the recesses on page "1." For example, outline 31 is the silhouette of recess 30 and, also of tile 23. Similarly outline 32 is the silhouette of tile 21, outline 33 that of tile 22, and outline 34 that of tile 20.

As may be seen in FIG. 2, the reverse side of panel 14 is designated on page "3" and is opposed to the side of panel 32, which is marked as page "4." Page "4," like page "2" is marked with outlines, and page "3," like page "1," is provided with recesses. These outlines and recesses are suitable for the reception of matching tiles which may bear such words as "cow" or "pig" or the likeness of such animals. One such tile 33 is shown in FIG. 7, a rectangle bearing the word "PIG," and a second tile 34 in FIG. 8, bearing the picture of a pig. A rectangular recess 35 sized to receive tile 33 is shown on page "3" together with a recess 36 shaped to receive tile 34.

Embedded in the base layers of the tiles and the panels are pairs of small bar magnets. The magnets in each pair are parallel and spaced apart in side-by-side relation and there is such a pair within each tile and within each panel below the surface of each of the recesses therein. In addition, each pair of magnets in a panel is below one of the outlines appearing on the opposite side of the panel from the recesses therein. For example, magnets 37 and 38 in panel 14 are beneath outline 31 on page "2" and also beneath recess 35 on page "3."

By properly matching the polarity of the various magnets it is possible to produce an opposed pair of pages (for example, pages "1" and "2") with four associated tiles, all so constructed that each tile will be attracted to only its own recess, and will cling to only one of the associated outlines. For example, tile 21 is constructed with magnets 39 and 40, both with their north poles to the right as seen in FIG. 3. Tile 21 will be retained in recess 29 by magnets 41 and 42, which are positioned within panel 13 with their south poles to the right, as seen in FIG. 1. If tile 21 is placed over outline 32 it will cling there, since magnets 43 and 44 under said outline also have their south poles to the right, as seen in FIG. 1. It is possible to vary the polarity positions of the north and south poles of the magnets in panels 13 and 14 so that the magnets in tile 21 will not match the magnets in any recess but recess 29, or any outline but outline 32. This is possible because within each pair of magnets there are four possible orientations of polarity, both north poles to the right, both to the left, the top one to the right and the bottom to the left, and the top one to the left and the bottom to the right.

As may be seen by comparing FIGS. 1 and 2, magnets 37 and 38 serve both to hold tile 23 over outline 31 on page "2" and to hold tile 33 in recess 35 on page "3."

If desired, the various storage recesses for the tiles may be keyed to particular tiles by printing the same word in the recess as appears on the tile. For example, the word "DOG" is partially shown at the bottom of recess 27 which is adapted to hold tile 20, which also bears this word and is shown partially cut away in FIG. 1.

In order to make it plain which tiles are associated with a given panel, both the tile and the panel surface may be colored. For example, pages "1" and "2" and tile 20 may be tinted red, while pages "3" and "4," and tile 33 are tinted green.

The invention as described enables the child user to learn to match pictures of objects on tiles with their outlines on panels, and then to go on to match the word for each object with the picture thereof. When the tiles are in their receptacles the book may be closed without displacing them, the magnets holding them in place during this operation. Once the book is closed, the magnets and the walls of the recesses retain the tiles in the recesses.

The following is claimed:

1. In a book for teaching the relationship between paired symbols, each symbol in a pair being related to the other, said book comprising a plurality of panels bound together with adjacent panels having first and second faces, the improvement comprising:
    (a) a plurality of movable tiles associated with each pair of opposed faces, each tile bearing a symbol;
    (b) a separate storage position for each tile on the first face of the pair of opposed faces with which said tile is associated;
    (c) a separate receiving position for each tile on the second face of the pair of opposed faces with which said tile is associated, the correspondence between said tile and said receiving position being indicated by a symbol on the second face related to that on said tile;
    (d) hidden magnetic cohesion means for causing each tile to cohere to the storage position with which it is associated and also to the receiving position with which it is associated;
    (e) hidden magnetic repulsion means for repelling each tile from storage and receiving positions with which it is not associated, where said storage or receiving positions are on one of the pairs of opposed faces with which said tile is associated.

2. The book of claim 1 wherein the separate storage positions comprise surfaces defining a recess into which the tile fits.

3. The book of claim 1 wherein the separate receiving positions comprise printed outlines of the tiles.

4. The book of claim 1 wherein the hidden magnetic cohesion and repulsion means comprise a magnet in the panels at each storage position and at each receiving position and a magnet embedded in each tile, said magnets being arranged so that when a tile is in the storage or receiving position with which it is associated the magnetic poles of the magnet in the panels at said positions are juxtaposed with opposite magnetic poles in the tile, but when said tile is in storage as receiving positions other than those with which it is associated at least one magnetic pole of the magnet at said storage receiving position is juxtaposed with a similar pole of the magnet in said tile.

5. The book of claim 1 wherein the hidden magnetic cohesion and repulsion means comprise a pair of magnets embedded in the panels at each storage position and at each receiving position and a pair of magnets embedded in each tile, said magnets being arranged so that when a tile is in the storage or receiving position with which it is associated the magnetic poles of the magnets in the panels at said positions are juxtaposed with opposite magnetic poles in the tile, but when said tile is in storage or receiving positions other than those with which it is associated at least one magnetic pole of a magnet at said storage receiving position is juxtaposed with a similar magnetic pole of a magnet in said tile.

6. The book of claim 1 wherein the magnetic cohesion means comprise a pair of bar magnets in each tile, said magnets being arranged in parallel, side-by-side, spaced relation, and two pairs of bar magnets, one pair in each panel respectively located below those storage and receiving positions in said panels which are associated with said tile, said latter pairs of bar magnets being arranged to underlie the magnets in said tile when said tile is in the storage or receiving positions, with the poles of the magnets in the panel being juxtaposed with opposite poles of the magnets in the tile, whereby attractive force is created between the magnets in the panel and those in the tile.

7. The book of claim 6 wherein the hidden magnetic repulsion means comprise a pair of bar magnets arranged in parallel, side-by-side, spaced relation within a panel with at least one of said magnets having its poles juxtaposed with like poles in one of the bar magnets in the tile when said tile is in a storage or receiving position other than that with which it is associated, whereby a repulsive force is exerted on said tile.

8. The book of claim 1 wherein the tile positions on opposite sides of the panels overlap in pairs and the same magnetic cohesion means serve both positions in said pairs.

References Cited

UNITED STATES PATENTS 2,570,625  10/1951  Zimmerman et al. ___ 35—71 X
3,010,228  11/1961  Torre _____ 35—73

EUGENE R. CAPOZIO, Primary Examiner

H. S. SKOGQUIST, Assistant Examiner

U.S. Cl. X.R.

35—35